A. L. Drake,
Washing Machine,
No. 56,733. Patented July 31, 1866.
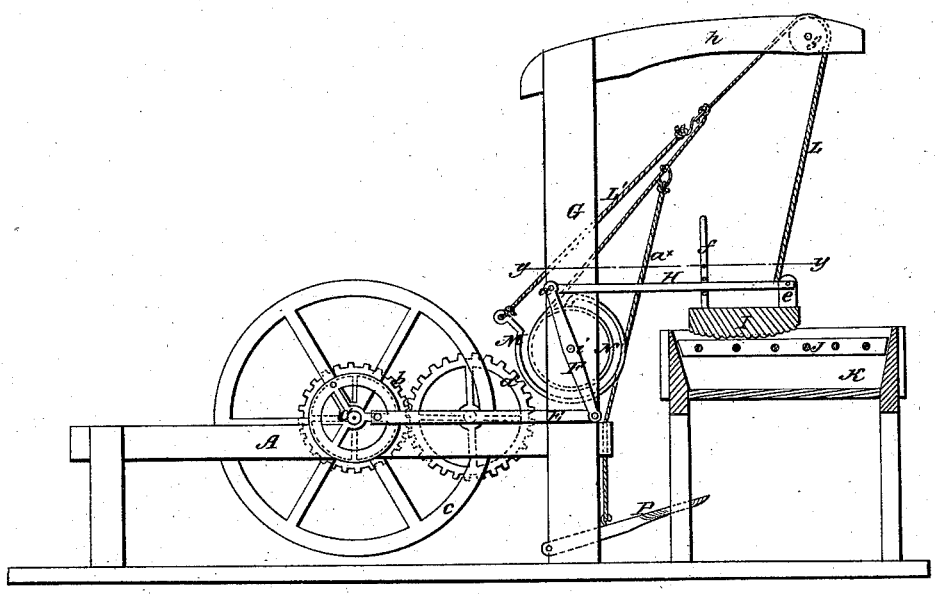
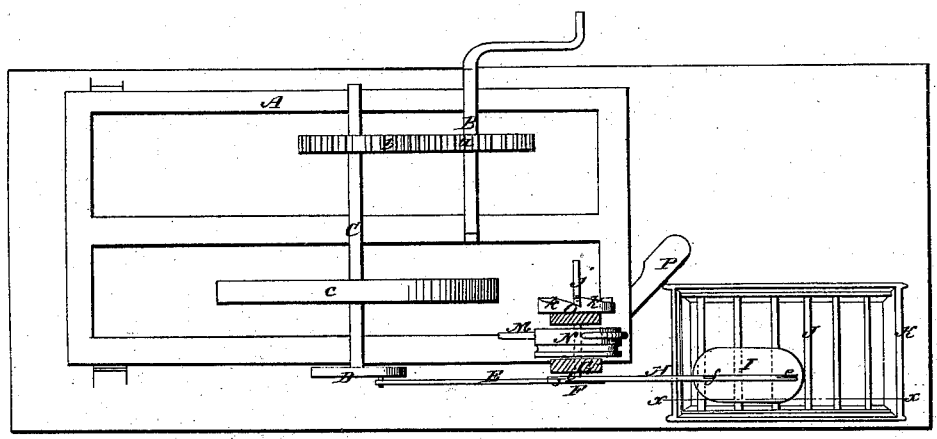
Witnesses.  Inventor.

UNITED STATES PATENT OFFICE.

AUGUSTUS L. DRAKE, OF RICHMOND, MAINE.

IMPROVEMENT IN WASHING-MACHINES.

Specification forming part of Letters Patent No. 56,733, dated July 31, 1866.

*To all whom it may concern:*

Be it known that I, A. L. DRAKE, of Richmond, in the county of Sagadahoc and State of Maine, have invented a new and Improved Washing-Machine; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\,x$, Fig. 2; Fig. 2, a plan or top view of the same.

Similar letters of reference indicate like parts.

This invention relates to a new and improved clothes-washing machine of that class in which a reciprocating rubber is employed; and it consists in a novel manner of operating the same and graduating the pressure thereof, as hereinafter fully shown and described, whereby the clothes will be subjected to a requisite degree of rubbing to thoroughly cleanse them, without injuring them in the least.

A represents a framing, which may be constructed in any proper manner to support the working part, and B is a driving-shaft, having a toothed wheel, $a$, upon it, which gears into a wheel, $b$, on a shaft, C, parallel with B, and having a fly-wheel, $c$, upon it. On one end of this shaft C there is a crank-wheel, D, having a pitman, E, connected to it, and F is a lever attached to one side of an upright, G, and having the pitman E attached to its lower end.

The upper end of the lever F has an arm, H, connected to it by a pivot, $d$, and the outer end of this arm is pivoted to a short upright, $e$, attached to the back of a rubber, I, near its front end, an upright, $f$, extending up from the back of the rubber near its rear end and passing loosely through the arm H.

The under surface of the rubber I is of convex form longitudinally, and is corrugated transversely, and said rubber rests and works upon a slatted bottom, J, placed horizontally in a suds-box, K.

The outer end of the arm H has a cord, L, attached to it, and this cord extends upward over a pulley, $g$, placed in an arm, $h$, and extends downward and is attached to a drum, N, the shaft $i$ of which passes horizontally through the upright G.

To the cord L there is attached another cord, L′, which is connected to a spring, M, on drum N. On one end of this shaft there is fitted a crank, $j$, for the purpose of turning the drum N to raise or lower the rubber I, and the drum may be retained at any desired point by means of ratchet-shaped teeth $k$ on a circular plate, O, attached to the upright, and against which teeth the crank $j$ catches.

The rubber I has a reciprocating motion communicated to it by means of the gearing, lever, crank-pulley, pitman, and arm previously described, the rubber acting upon the clothes which are placed on the slotted bottom J. If the upright $f$ be allowed to be loose or free in the arm H, the rubber I will work in a horizontal plane; but when quick work is required a rocking motion is given the rubber by pinning the arm H to the upright $f$. This rocking motion of the rubber admits of the ends passing freely through the texture of the clothes.

The spring M serves to lighten the pressure of the rubber upon the clothes in cases where fine clothes are being operated upon, the drum N being adjusted so that the spring M will sustain in a certain degree the rubber.

This machine operates very similar to hand-rubbing, and, if necessary or desired, a treadle, P, may be attached to cord L by a cord, $a^*$, for the purpose of quickly raising the rubber whenever required.

Having thus described my invention, I claim as new and desire to secure by Letters Patent—

1. The operating of the reciprocating rubber by means of the gearing, pitman, lever, and arm, the latter being connected to or applied to the rubber by a pivot and upright guide, arranged as shown, so that the rubber may work in a plane or with a rocking motion, as set forth.

2. The drum N and cord L, in combination with the reciprocating rubber I, spring M, and cord L′, substantially as and for the purpose specified.

3. The crank $j$, in combination with the toothed plate O, for retaining the drum N in position, as described.

AUGUSTUS L. DRAKE.

Witnesses:
SUMNER ADAMS,
ELLEN M. YEATON.